US005307180A

United States Patent [19]

Williams et al.

[11] Patent Number: 5,307,180

[45] Date of Patent: Apr. 26, 1994

[54] METHOD AND APPARATUS FOR CONTROLLING THE PROCESSING OF DIGITAL IMAGE SIGNALS

[75] Inventors: Leon C. Williams, Walworth; Francis K. Tse, Rochester; Robert F. Buchheit, Webster, all of N.Y.

[73] Assignee: Xerox Corporation, Stamford, Conn.

[21] Appl. No.: 809,807

[22] Filed: Dec. 18, 1991

[51] Int. Cl.[5] ........................ H04N 1/40; H04N 1/387; G06K 9/36

[52] U.S. Cl. .................................... 358/448; 358/443; 358/453; 382/41

[58] Field of Search ............... 358/448, 452, 453, 443, 358/444; 382/41, 42, 44, 47, 49, 9, 27

[56] References Cited

U.S. PATENT DOCUMENTS

| | | | |
|---|---|---|---|
| 4,760,463 | 7/1988 | Nonoyama et al. | 358/280 |
| 4,780,709 | 10/1988 | Randall | 340/721 |
| 4,811,115 | 3/1989 | Lin et al. | 358/283 |
| 4,887,163 | 12/1989 | Maeshima | 358/443 |
| 4,897,803 | 1/1990 | Calarco et al. | 364/518 |
| 4,951,231 | 8/1990 | Dickinson et al. | 364/521 |
| 5,086,346 | 2/1992 | Fujisawa | 358/448 |

*Primary Examiner*—Edward L. Coles, Sr.
*Assistant Examiner*—Thomas D. Lee
*Attorney, Agent, or Firm*—Duane C. Basch

[57] ABSTRACT

A method and apparatus for controlling the execution of image processing operations carried out on an array of image signals, the specific operations having been identified by a plurality of predefined windows. The windows are divided into a plurality of non-overlapping tiles, the boundaries of which correspond to transitions from one window region to another. Each tile therefore defines an exclusive region within the array of image signals, and the image processing operations to be applied to the signals within the boundaries of that region. Tile data is stored in one of two memory banks, thereby enabling bank switching and reprogramming of the device in real-time to permit management of complex window shapes. The apparatus is designed to efficiently manage the identification of tile regions while minimizing the required decoding hardware. The apparatus also provides flexibility of programming resulting in greater efficiency of memory usage.

21 Claims, 9 Drawing Sheets

METHOD AND APPARATUS FOR CONTROLLING THE PROCESSING OF DIGITAL IMAGE SIGNALS

This invention relates generally to a digital signal processing apparatus, and more particularly to the control of digital image processing operations which may be applied to an array of digital signals which are representative of an image.

CROSS REFERENCE

The following related applications and patents are hereby incorporated by reference for their teachings:

"Improved Automatic Image Segmentation", Shiau et al., Ser. No. 07/722,568, filed Jun. 27, 1991;

"Method and Apparatus for Implementing Two-dimensional Digital Filters", Clingerman et al., application Ser. No. 07/809,897 filed concurrently herewith;

U.S. Pat. No. 4,811,115 to Lin et al., Issued Mar. 7, 1989; and

U.S. Pat. No. 4,897,803 to Calarco et al., Issued Jan. 30, 1990.

BACKGROUND OF THE INVENTION

The features of the present invention may be used in the printing arts, and, more particularly, in digital image processing and electrophotographic printing. In digital image processing it is commonly known that various image processing operations may be applied to specific areas, or windows, of an image. It is also known that the image processing operations to be applied to individual pixels of the image may be controlled or managed by a pixel location comparison scheme. In other words, comparing the coordinate location of each pixel with a series of window coordinate boundaries to determine within which window a pixel lies. Once the window is determined, the appropriate processing operation can be defined for the digital signal at that pixel location. In general, the window identification and management systems previously employed for image processing operations have been limited to rectangularly shaped, non-overlapping windows. In the interests of processing efficiency and hardware minimization, including memory reduction, a more efficient window management system is desired. Accordingly, the present invention provides an improved method and apparatus for the management of multiple image processing operations which are to be applied to a stream of digital signals representing an image.

Previously, various approaches have been devised for the control of digital image processing and window management, of which the following disclosures appear to be relevant:

U.S. Pat. No. 4,760,463
Patentee: Nonoyama et al.
Issued: Jul. 26, 1988

U.S. Pat. No. 4,780,709
Patentee: Randall
Issued: Oct. 25, 1988

U.S. Pat. No. 4,887,163
Patentee: Maeshima
Issued: Dec. 12, 1989

U.S. Pat. No. 4,897,803
Patentee: Calarco et al.
Issued: Jan. 30, 1990

U.S. Pat. No. 4,951,231
Patentee: Dickinson et al.
Issued: Aug. 21, 1990

The relevant portions of the foregoing patents may be briefly summarized as follows:

U.S. Pat. No. 4,760,463 to Nonoyama et al. discloses an image scanner including an area designating section for designating a rectangular area on an original and a scanning mode designating section for designating an image scanning mode within and outside the rectangular area designated by the area designating section. Rectangular areas are defined by designating the coordinates of an upper left corner and a lower right corner. Subsequently, counters are used for each area boundary, to determine when the pixel being processed is within a specific area.

U.S. Pat. No. 4,780,709 to Randall discloses a display processor, suitable for the display of multiple windows, in which a screen may be divided into a plurality of horizontal strips which may be a single pixel in height. Each horizontal strip is divided into one or more rectangular tiles. The tiles and strips are combined to form the viewing windows. Since the tiles may be a single pixel in width, the viewing window may be arbitrarily shaped. The individual strips are defined by a linked list of descriptors in memory, and the descriptors are updated only when the viewing windows on the display are changed. During generation of the display, the display processor reads the descriptors and fetches and displays the data in each tile without the need to store it intermediately in bit map form.

U.S. Pat. No. 4,887,163 to Maeshima discloses an image processing apparatus having a digitizing unit capable of designating desired areas in an original image and effecting the desired image editing process inside and outside the designated areas. A desired rectangular area is defined by designating two points on the diagonal corners of the desired rectangular area. During scanning, a pair of editing memories are used interchangeably to enable, first, the editing of thresholded video data from a CCD and, second, the writing of editing information for use with subsequent video data. The editing memories comprises a memory location, one byte, for each CCD element, said location holding image editing data determining the editing process to be applied to the signal generated by the respective CCD element.

U.S. Pat. No. 4,897,803 to Calarco et al., the relevant portions of which are incorporated by reference, discloses a method and apparatus for processing image data having an address designation, or token, associated with each data element, thereby identifying the element's location in an image. During processing of the image data, the address token for each data element is passed through address detection logic to determine if the address is an "address of interest," thereby signaling the application of an image processing operation.

U.S. Pat. No. 4,951,231 to Dickinson et al. discloses an image display system in which image data is stored as a series of raster scan pel definition signals in a data processor system. The position and size of selected portions of an image to be displayed on a display screen can be transformed, in response to input signals received from a controlled input device. The display device includes a control program store which stores control programs for a plurality of transform operations, such as rotation, scaling, or extraction.

The present invention seeks to overcome the limitations of the systems disclosed in the references by efficiently handling the control and management of the image processing effects selected for specific windows.

The present invention also seeks to reduce the hardware complexity and/or memory requirements of such an image processing control system by reducing the amount of non-data information needed to identify the image processing operation that is to be applied to each data element.

In accordance with one aspect of the present invention, there is provided an apparatus for managing the processing of an array of digital signals representing an original image, in order to produce an array of modified digital signals. The image processing apparatus is able to operate on non-overlapping rectangular regions, or tiles, defined with respect to the input signal array, and to thereby identify image processing effects to be applied to the signals lying within the tiles. In response to the identified image processing effects defined for each signal, image processing hardware within the system is selectively enabled to process the signals.

Pursuant to another aspect of the present invention, there is provided an apparatus for managing the selection and control of the image processing effects to be applied to the image data, the apparatus having means for storing the effects within a block of memory which is accessible via an index or pointer value. The apparatus further including means for determining the effect pointer for each of a plurality of non-overlapping tile regions within the image data, and selectively enabling the image processing operations associated with those effects for signals within the regions.

Pursuant to another aspect of the present invention, there is provided a method for controlling the application of a plurality of image processing operations to a stream of digital image signals. The method operates with respect to a set of predetermined, non-overlapping tile boundaries by selectively controlling the utilization of hardware components through which the signals pass.

The present invention will be described in connection with a preferred embodiment, however, it will be understood that there is no intent to limit the invention to that embodiment. On the contrary, the intent is to cover all alternatives, modifications, and equivalents as may be included within the spirit and scope of the invention as defined by the appended claims.

DESCRIPTION OF THE PREFERRED EMBODIMENT

The following description includes references to slow-scan and fast-scan directions when referring to the orientation, or directionality, within orthogonal arrays of digital image signals. For purposes of clarification, fast-scan data is intended to refer to individual pixel signals located in succession along a single raster of image information, while slow-scan data would refer to data derived from a common raster position across multiple rasters or scanlines. As an example, slow-scan data would be used to describe signals captured from a plurality of elements along a linear photosensitive array as the array moves relative to the document. On the other hand, fast-scan data would refer to the sequential signals collected along the length of the linear photosensitive array during a single exposure period, and is also commonly referred to as a raster of data. More importantly, these references are not intended to limit the present invention solely to the processing signals obtained from an array of stored image signals, rather the present invention is applicable to a wide range of video input devices which generally produce video output as a sequential stream of video signals.

Figure 1:
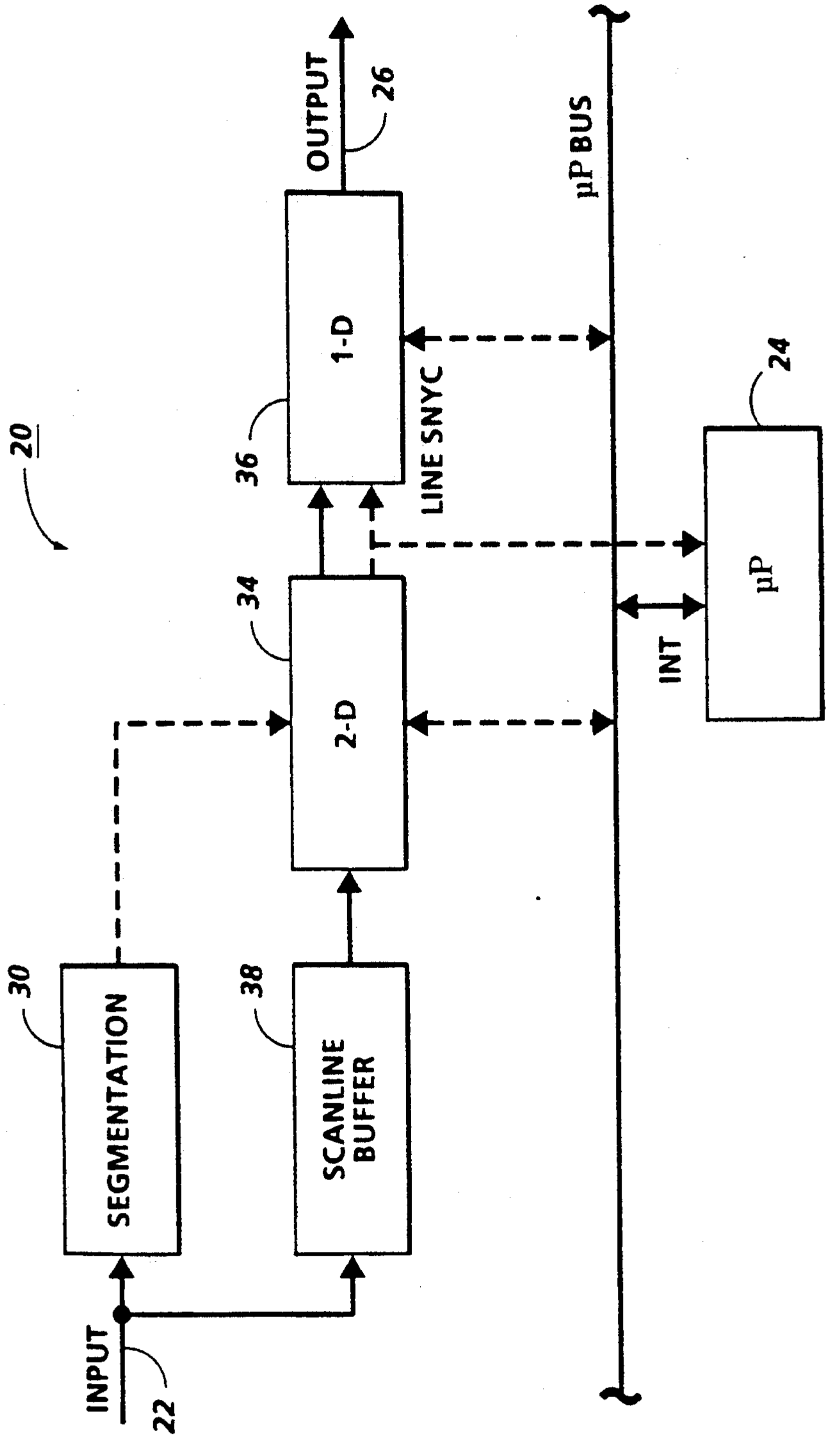
FIG. 1 is a block diagram illustrating the architecture of a system employing the present invention.

For a general understanding of the image processing hardware module incorporating the features of the present invention, reference is made to the drawings. In the drawings, like reference numerals have been used throughout to designate identical elements. FIG. 1 schematically depicts the various components of a digital image processing hardware module that might be used in an electroreprographic system for the processing and alteration of video signals prior to output on a xerographic printing device.

Referring now to FIG. 1, which illustrates a possible image processing module architecture, image processing module 20 would generally receive offset and gain corrected video signals on input lines 22. The video input data may be derived from a number of sources, including a raster input scanner, a graphics workstation, or electronic memory, and similar storage elements. Moreover, the video input data in the present embodiment generally comprises 8-bit grey data, passed in a parallel fashion along the input data bus. Subsequently, module 20 would process the input video data according to control signals from microprocessor ($\mu$P) 24 to produce the output video signals on line 26. As illustrated, module 20 may include an optional segmentation block 30 which has an associated line buffer (not shown), two-dimensional filter 34, and an optional one-dimensional effects block, 36. Also included in module 20 is scanline buffer memory 38, comprising a plurality of individual scanline buffers for storing the context of incoming scanlines.

Segmentation block 30, in conjunction with its associated scanline buffer, which provides at least one scanline of storage, is intended to parse the incoming video data to automatically determine those areas of the image which are representative of a halftone input region. Output from the segmentation block (Video Class) is used to implement subsequent image processing effects in accordance with the type or class of video signals identified by the segmentation block. For example, the segmentation block may identify a region containing data representative of an input halftone image, in which case a low pass filter would be used to remove screen patterns. Otherwise, a remaining text portion of the input video image may be processed with an edge enhancement filter to improve fine line and character reproduction when thresholded.

Additional details of the operation of segmentation block 30 may be found in the pending U.S. patent application for "Improved Automatic Image Segmentation" (Ser. No. 07/722,568) by Shiau et al., the teachings of which are hereby incorporated by reference in the instant application. Another relevant reference is U.S. Pat. No. 4,811,115 to Lin et al. (Issued Mar. 7, 1989) which teaches the use of an approximate autocorrelation function to determine the frequency of a halftone image area. The relevant portions of U.S. Pat. No. 4,811,115 are hereby incorporated for its teachings with respect to halftone image identification.

One important aspect of incorporating the segmentation block in the image processing module is the requirement for a one scanline delay in video output. This requirement stems from the fact that the segmentation block needs to analyze the incoming line prior to determining the characteristics of the incoming video. Hence, the incoming corrected video is fed directly to segmentation block 30, while being delayed for subsequent use by two-dimensional filter 34, in line buffer memory 38.

Two-dimensional (2 D) filter block 34, incorporating the elements of the present invention, is intended to process the incoming, corrected video in accordance with a set of predefined image processing operations, as controlled by a window effects selection and video classification. As illustrated by line buffer memory 38, a plurality of incoming video data may be used to establish the context upon which the two-dimensional filter and subsequent image processing hardware elements are to operate. To avoid deleterious affects to the video stream caused by filtering of the input video, prior to establishing the proper filter context, the input video may bypass the filter operation on a bypass channel within the two-dimensional filter hardware. Further details of the two-dimensional filtering treatments are included in copending U.S. patent application "Method and Apparatus for Implementing Two-Dimensional Digital Filters", by Clingerman et al. U.S. application Ser. No. 07/109,897, the relevant portions of which are hereby incorporated by reference in the instant application.

Subsequent to two-dimensional filtering, the optional one-dimensional (1 D) effects block is used to alter the filtered, or possibly unfiltered, video data in accordance with a selected set of one-dimensional video effects. One-dimensional video effects include, for example, thresholding, screening, inversion, tonal reproduction curve (TRC) adjustment, pixel masking, one-dimensional scaling, and other effects which may be applied one-dimensionally to the stream of video signals. As in the two-dimensional filter, the one-dimensional effects block also includes a bypass channel, where no additional effects would be applied to the video, thereby enabling the 8-bit filtered video to be passed through as output video.

Selection of the various combinations of "effects" and filter treatments to be applied to the video stream is performed by $\mu$P 24, which may be any suitable microprocessor or microcontroller. Through the establishment of window tiles, various processing operations can be controlled by directly writing to the control memory contained within the 2 D block, from which the operation of the image processing hardware is regulated. More specifically, independent regions of the incoming video stream, portions selectable on a pixel by pixel basis, are processed in accordance with predefined image processing parameters or effects. The activation of the specific effects is accomplished by selectively programming the features prior to or during the processing of the video stream. Also, the features may be automatically selected as previously described with respect to image segmentation block 30. In general, $\mu$P 24 is used to initially program the desired image processing features, as well as to update the feature selections during real-time processing of the video. The data for each pixel of image information, as generated by the tiling apparatus and video classification described herein, may have an associated identifier or token to control the image processing operations performed thereon, as described in U.S. Pat. No. 4,897,803 to Calarco et al. (Issued Jan. 30, 1990). The relevant portions of U.S. Pat. No. 4,897,803 are hereby incorporated by reference for their teachings with respect to methods for controlling the processing of digital image data.

Figure 2A:
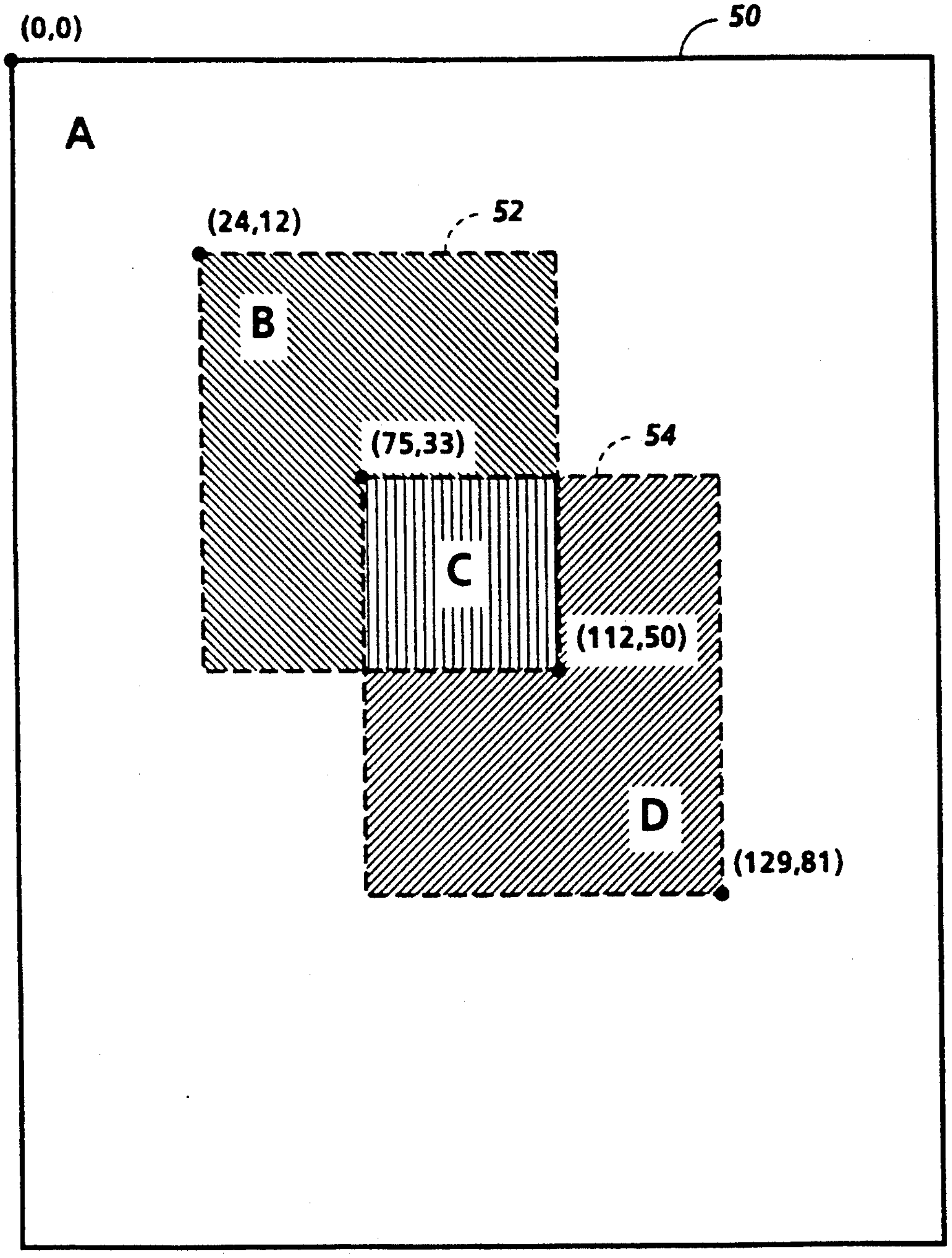
FIG. 2A is an example of an array of image signals which depicts the use of a pair of windows defined within the array, while FIG. 2B further illustrates the division of the image array of FIG. 2A.

Referring now to FIG. 2A, which depicts an example array of image signals 50 having overlapping windows 52 and 54 defined therein; the windows are used to designate different image processing operations which are effects to be applied to the image signals in the array. In general, windows 52 and 54 serve to divide the array into four distinct regions, A–D. Region A includes all image signals outside of the window regions. Region B encompasses those image signals which fall within window 52 and outside of window 54. Similarly, region D includes all image signals within window 54 lying outside of window 52, while, region C includes only those image signals which lie within the boundaries of both windows 52 and 54, the region generally referred to as the area of "overlap" between the windows. It is commonly known to use windows, and even overlapping windows, to implement image editing functions for image arrays, or for mapping video displays. It is, however, less commonly known to identify independent and distinct regions within the image which are defined by the overlapping windows. For purposes of discussion, these independent areas or regions are referred to as tiles.

Figure 2B:
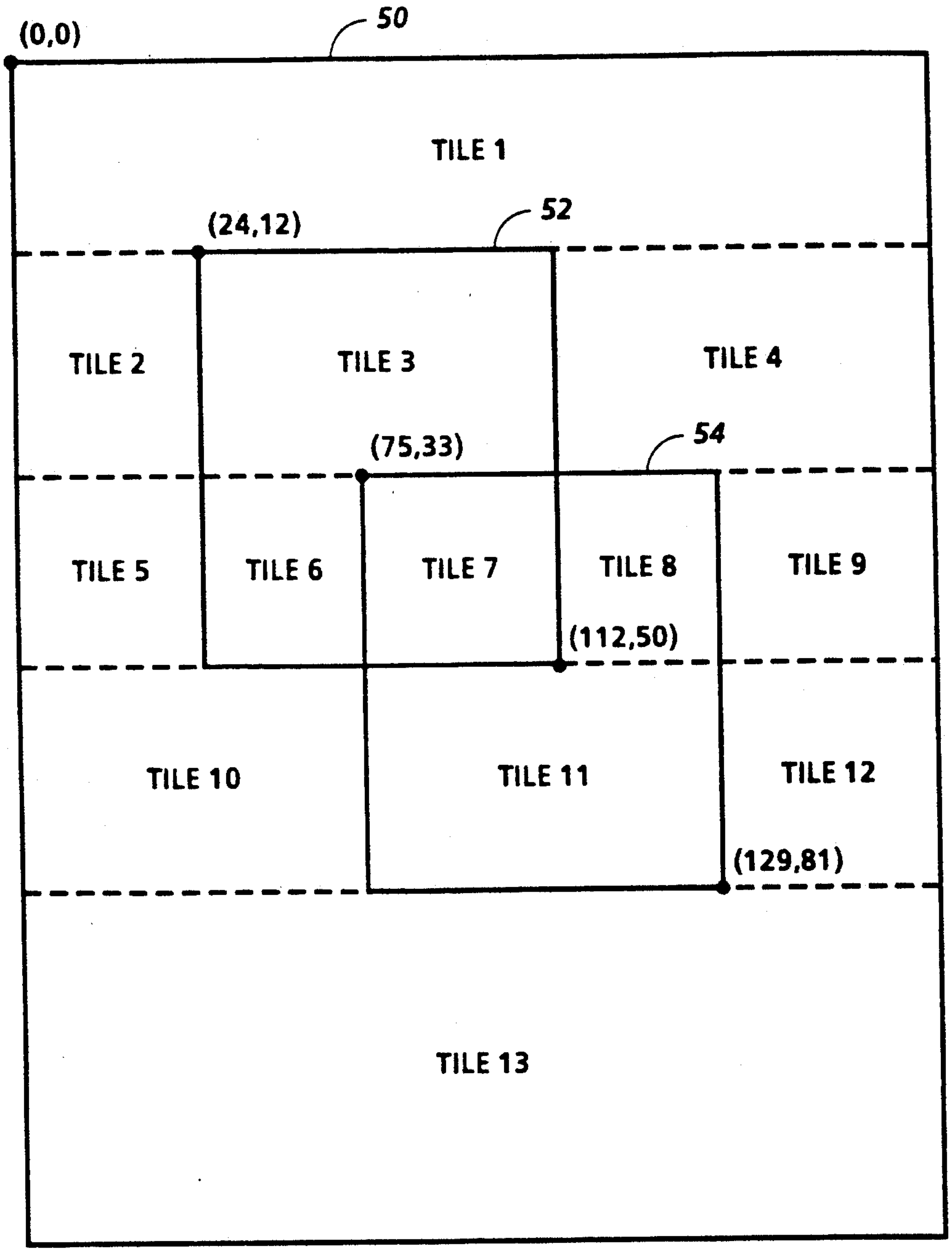

Referring also to FIG. 2B, where image array 50 of FIG. 2A has been further divided into a plurality of independent, non-overlapping tiles, the tiles are generally defined by transitions from the different regions identified in FIG. 2A. For instance, tile 1 is the region extending completely along the top of array 50. Tile 2 is a portion of the region that is present between the left edge of the image array and the left edge of window 52. Continuing in this fashion, region A of FIG. 2A is determined to be comprised of tiles 1, 2, 4, 5, 9, 10, 12, and 13. Similarly, region B is comprised of tiles 3 and 6, region D of tiles 8 and 11, and region C of tile 7. As is apparent from FIG. 2B, the tiles are defined along a fast-scan orientation. In other words, the transitions between regions A, B, C, and D that occur along the fast-scan direction define the locations of the tile boundaries. The directionality of the tile orientation is generally a function of the orientation in which the image signals are passed to image processing module 20.

In the present invention, the resolution of the tile boundaries is a single pixel in the fast-scan direction, and a single scanline in the slow-scan direction. The high resolution of the boundaries enables the processing of windows or regions having complex shapes, and is not limited to the purely orthogonal boundaries typically associated with the term windows. The image processing operations specified for each of the tiles which comprise a window or region are controlled by a window control block present within 2 D block 34 of FIG. 1. The origin of these regular or complex window shapes can be obtained from a variety of sources including, but not limited to, edit pads, CRT user interfaces, document location sensors, etc.

Figure 3:
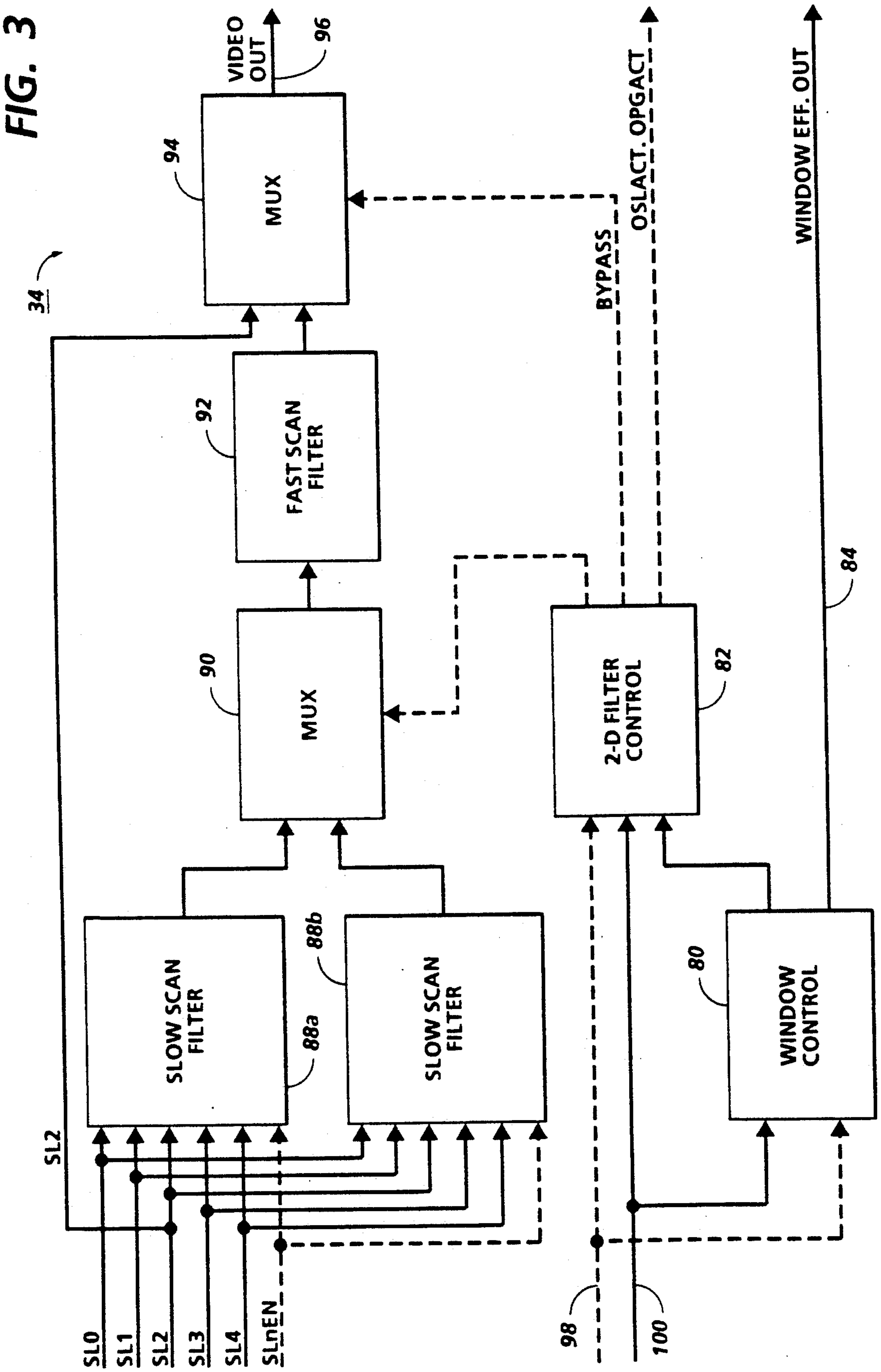
FIG. 3 is a detailed block diagram of the two-dimensional (2 D) block of FIG. 1.

Referring now to FIG. 3, which further details the hardware design for the two-dimensional image processing block, block 34 of FIG. 1, window control block 80 is used to control operation of 2 D filter control block 82, as well as to send a window effects signal to the subsequent 1 D block, block 36 of FIG. 1, via output line 84. In operation, the two-dimensional filter, consisting of blocks 88*a*, 88*b*, 90, 92, and 94, generally receives image signals (SL0-SL4) from scanline buffer 38 and processes the signals in accordance with control signals generated by filter control block 82. More specifically, slow scan filter blocks 88*a* and 88*b* continuously produce the slow-scan filtered output context, which is selected by MUX 90 on a pixel-by-pixel basis for subsequent processing at fast-scan filter 92. Fast-scan filter 92 then processes the slow-scan context to produce a two-dimensional filtered output which is passed to MUX 94. MUX 94, controlled by filter control block 82, is the "switch" which selects between the filtered output and the filter bypass, in accordance with the selector signal from filter control 82, thereby determining the video signals to be placed on VIDEO OUT line 96.

Referring particularly to the operation of window control block 80, input signals are received from three sources. First, the timing and synchronizing signals are received via control signal lines 98. These signals generally include pixel clocking signals, and are used by both window control block 80 and by filter control block 82 to maintain control of the processed video output. Second, input data is received from microprocessor 24, via lines 100. The input data for filter control block 82 includes the filter coefficients and similar data necessary for operation of the two-dimensional filter. Input to the window control block generally comprises the tile boundary information, window effects data, and the window effects pointers for each of the tiles identified. Window control block 80 is implemented as a finite state machine which operates to selectively enable certain preprogrammed window effects, based upon the location of the video signal currently being processed, in relation to the array of image signals, as determined by corresponding tile boundaries. Third, the input from segmentation block 30 may be utilized, on a tile by tile basis, to override some or all of the window effects data based on the video classification determined by the segmentation block. The override of the window effects data enables the use of image processing operations that adjust dynamically to the image content.

Figure 4:
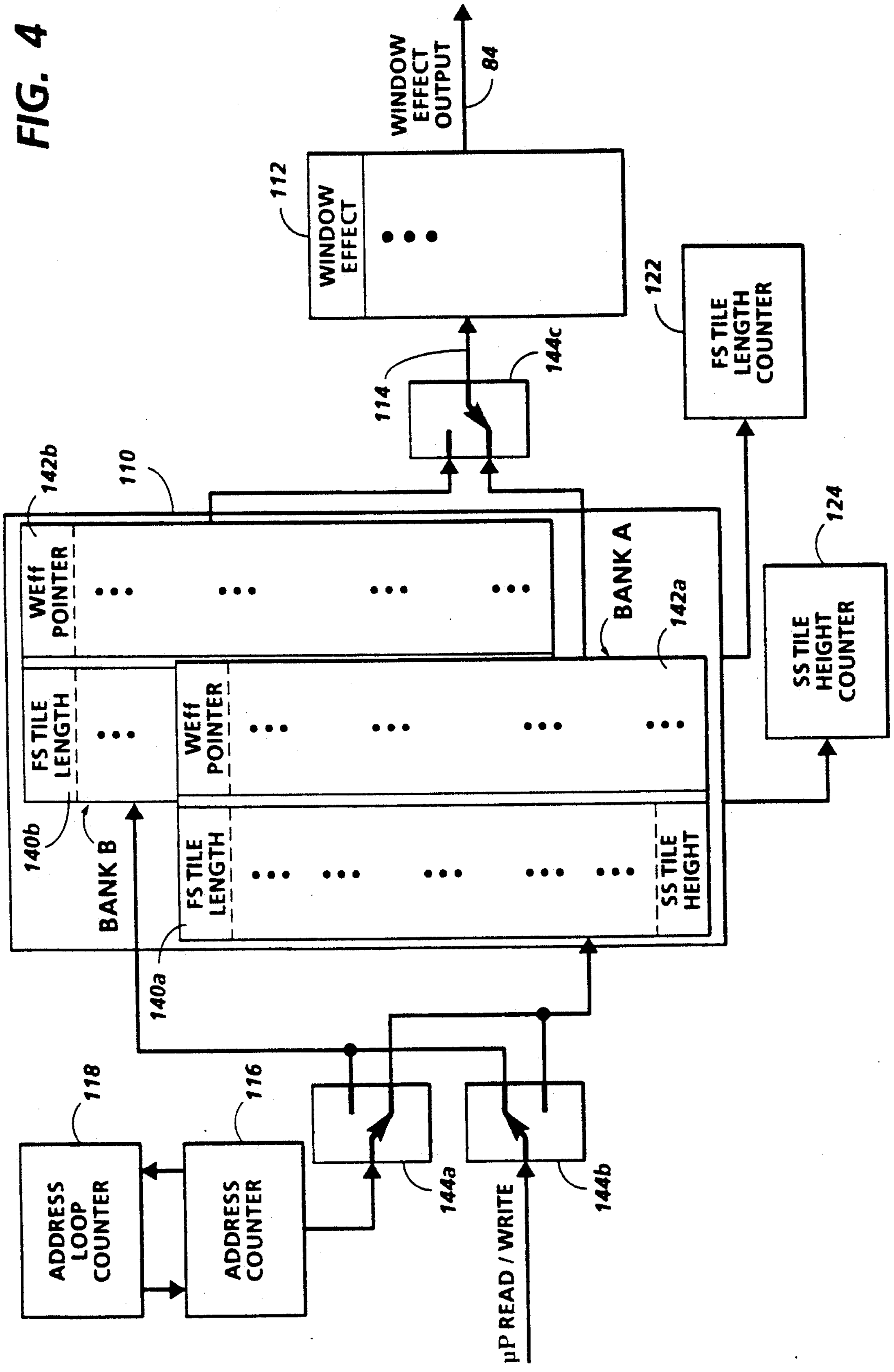
FIG. 4 is an illustration of the architecture for the tile control hardware used to implement the present invention.

As shown in FIG. 4, window control block 80 also includes random access memory (RAM) 110 which is organized to efficiently enable the real-time selection of the windowing effects to be applied to the video signals being processed by the 1 D and 2 D hardware elements. In the present embodiment, 1 D image processing block 36 receives video signals from 2 D image processing block 34, as well as window effects data from window control 80 within the 2 D image processing block. The 1 D image processing block, in one embodiment, is an application specific integrated circuit (ASIC) hardware device capable of implementing the one-dimensional image processing operations previously described. However, the functionality of 1 D image processing block 36 could be accomplished using numerous possible hardware or software signal processing systems. Moreover, additional functionality, not described with respect to the present embodiment, may be implemented by the windowing effects described. Accordingly, there is no intention to limit the present invention with respect to the functionality or design of the 1 D image processing block described in this embodiment.

Table A reflects the organization of the memory contained in the two-dimensional image processing hardware, block 34 of FIG. 1.

TABLE A

| | | 2D Memory Map |
|---|---|---|
| Address (hex) | Access | Contents |
| 00 | Write only | 2D Hardware Reset |
| 01 | Read/Write | Control Register |
| 02-03 | Read/Write | Segment.Window Effects Enable Reg. |
| 04-11 | Read/Write | Filter 1 Coefficients |
| 12-1F | Read/Write | Filter 1 Coefficients |
| 20-3F | Read/Write | Window Effects List |
| 40-7F | Read/Write | Window Tile Lengths List |
| 80-9F | Read/Write | Window Effects Pointers |
| A0-A7 | Read/Write | Segmentation Window Effects |

The memory banks illustrated in memory 110 include addresses 40-9Fh, while window effects memory 112 comprises addresses 20-3Fh.

Although operation of the hardware will be described in detail with respect to FIGS. 8A and 8B, a brief description follows to provide an understanding of the basic hardware architecture. Ordinarily, the window effect output, line 84, is controlled by the window effects pointer value present on line 114. However, the window effects pointer would have been previously determined by the currently "active" tile, the information which is stored in memory 110. Additionally, address counter 116 and address loop counter 118 are utilized to provide indexing to memory 110 to correctly "activate" the appropriate tile during processing of each scan line. Likewise, FS (fast-scan) Tile Length counter 122 and SS (slow-scan) Tile Height counter 124, both of which are implemented as count-down counters in the present invention, are used to control the sequencing of window control block 80.

Figure 5:
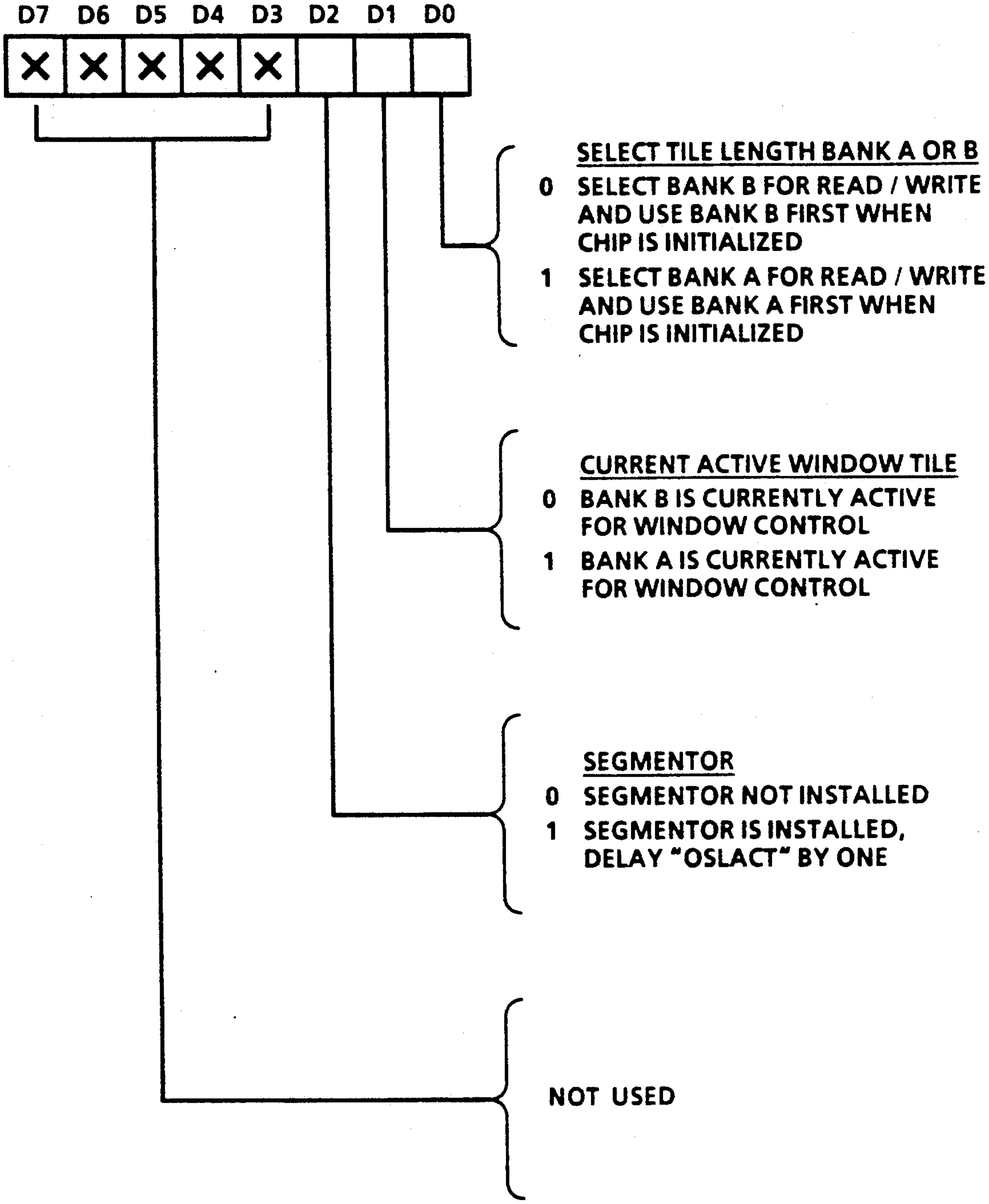
FIG. 5 is a pictorial representation of the bit allocation of a control register used in the hardware.
Figure 6:
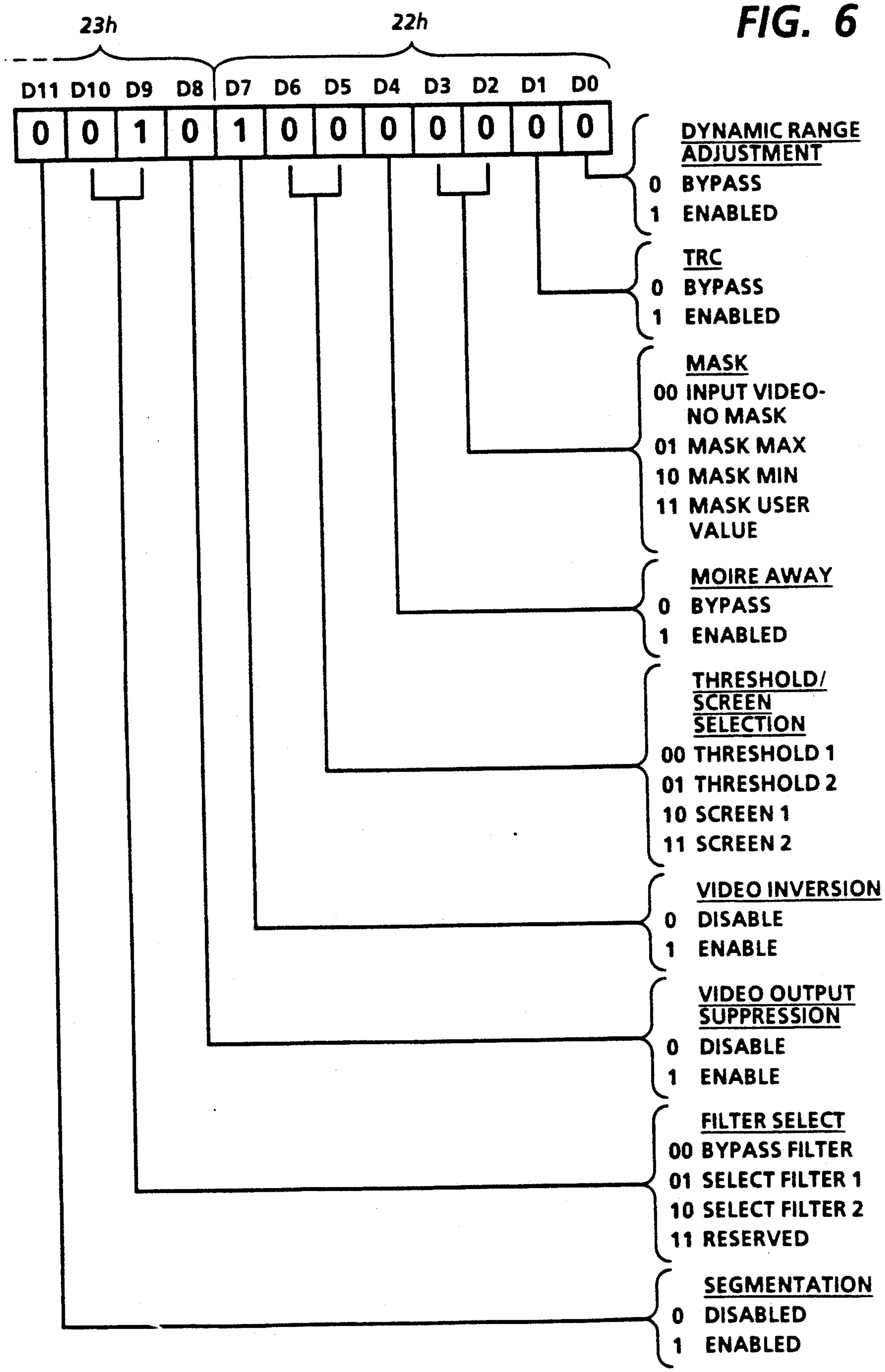
FIG. 6 is a pictorial representation of the bit allocation of a window effects register used in the hardware.

By considering FIGS. 4, 5 and 6, in conjunction with Table B1-B3, the details of the memory and control registers may be better understood. The convention employed for indication of binary data values in the following tabular representations of memory places a zero or a one where the binary level of the stored data is known; a "?" where the level is unknown or indefinite; and an "X" where the data bit is unused or unassigned.

Referring initially to FIG. 5, which depicts the bit assignment for the control register present at memory location 01*h*, the five most significant bits are unused, as indicated by the "X" in bit positions D3-D7. The least significant bit, D0 is used to select the memory bank, bank A or bank B, which is to be accessed when the hardware is initialized. The memory bank selected for initial access will also be the bank that is selected for subsequent programming via read/write access from μP 24 of FIG. 1. Bit position D1 of the control register is used to determine the memory bank, A or B, that is presently being used or accessed by the hardware, referred to as the "active" bank. Finally, bit position D2 is used to indicate to the hardware whether segmentation hardware block 30 has been installed and enabled.

TABLE B1

| Window Effects Memory Map | | | | | | | | | |
|---|---|---|---|---|---|---|---|---|---|
| Addr | | Data | | | | | | | |
| (hex) | Contents | D7 | D6 | D5 | D4 | D3 | D2 | D1 | D0 |
| 20 | LSB of Window Effect #0 | 0 | 0 | 0 | 0 | 0 | 0 | 0 | 0 |
| 21 | MSB of Window Effect #0 | X | X | X | X | 1 | 0 | 0 | 0 |
| 22 | LSB of Window Effect #1 | 1 | 0 | 0 | 0 | 0 | 0 | 0 | 0 |
| 23 | MSB of Window Effect #1 | X | X | X | X | 0 | 0 | 1 | 0 |
| 24 | LSB of Window Effect #2 | 0 | 0 | 0 | 1 | 0 | 0 | 0 | 0 |
| 25 | MSB of Window Effect #2 | X | X | X | X | 0 | 0 | 0 | 0 |
| 26 | LSB of Window Effect #3 | 0 | 1 | 0 | 0 | 1 | 0 | 0 | 0 |
| 27 | MSB of Window Effect #3 | X | X | X | X | 0 | 0 | 0 | 0 |
| 28 | LSB of Window Effect #4 | ? | ? | ? | ? | ? | ? | ? | ? |
| 29 | MSB of Window Effect #4 | X | X | X | X | ? | ? | ? | ? |
| . | | | | | | | | | |
| . | | | | | | | | | |
| . | | | | | | | | | |
| 3E | LSB of Window Effect #15 | ? | ? | ? | ? | ? | ? | ? | ? |
| 3F | MSB of Window Effect #15 | X | X | X | X | ? | ? | ? | ? |

Referring next to FIG. 6, in conjunction with Table B1, where the significance of bit positions for the window effects memory are illustrated, bit positions D0 through D11 are shown. Bit positions D0 through D7 straightforwardly correspond with the bits of the least significant byte (LSB) for each window. For example, address 22*h* of Table B1 contains the data for the LSB of Window Effect #1. Furthermore, bit positions D8 through D11 of FIG. 6 represent the associated least significant four bits of the MSB of Window Effect #1, as found in memory location 23*h*.

As shown by FIG. 6, bit position D0 determines whether the dynamic range adjustment will be carried out on all image signals lying within a tile. Typically, this adjustment would remap the input video signal to modify the range of the output video signal. Using Window Effect #1, as an example again, at bit D0 of address 22h, the binary value shown in Table B1 is a zero. Therefore, all tiles having pointers to Window Effect #1 will have no dynamic range adjustment applied to the video signals within the boundaries of the tile. Similarly, in bit position D1, the window effects memory in FIG. 6 controls the application of a tonal reproduction curve (TRC) adjustment operation. In general, this operation would be used to shift the relationship, or mapping, between an input video signal and an output video signal.

Moving now to consider bit positions D2 and D3 of FIG. 6, the two-bit value is determinative of the masking operation to be employed on the video signals treated by the window effect. As shown, the options include, no masking, masking to a minimum value (black), masking to a maximum value (white), or masking to a user specified value. Next, bit position D4 controls the application of a Moire reduction process to the video signals to eliminate aliasing caused by scanning of an original document with periodic structures (e.g., halftone patterns). In general, this feature injects a random noise signal into the video stream to reduce the periodicity of the input video signal. The threshold and screen selection is controlled by the binary values in bit positions D5 and D6. Selection between thresholded output or screened output is determined by the level of bit position D6, while position D5 selects between the threshold options or the halftone screen options. The last bit position, D7, is the least significant data byte for the window effects controls the video inversion feature. When enabled, this feature performs a simple "exclusive or" (XOR) operation on the video signal, thereby inverting the signal.

The remaining four bit positions are contained in the first four positions of the most significant data byte for each window effects memory location, for example address 23*h*, for Window Effect #1. Specifically, bit position D8 is used to enable or disable the video output suppression feature that actually acts as a gating device to stop output of the video, whenever the current window effect has the value in this position set to a logical one. From a practical perspective, this feature allows the actual removal of a portion of the video signal stream that lies within the tile, thereby enabling, but not necessarily limited to, image cropping. For example, suppression can also be used to remove undesired areas such as the binding margin when scanning or copying books. Bit positions D9 and D10 are used to select or bypass the two-dimensional filters which are part of the hardware on the 2D block of FIG. 1. Finally, the optional image segmentation hardware, block 30 of FIG. 1, is controlled by bit position D11. Essentially, the binary value in this position determines whether the image segmentation operation will be enabled within the tile using this window effect. As an illustration, consider Window Effect #0 in Table B1 (address 21*h*). Where bit position D11 contains a one, the segmentation chip would be enabled in all tiles having tile pointers which "point" to Window Effect #0. Hence, those tiles would allow segmentation hardware block 30 to determine the content of the video signals within the tile and thereby automatically select the appropriate image processing operations to be applied to the regions within the tile on a pixel-by-pixel basis. In these regions, some or all of the video effects normally associated with that tile's pointer may be overridden with effects stored within Segmentation Window Effects registers (not shown), locations (A0–A7*h*), as selected by the video classification (from the segmentation block) for that pixel. The Segment Window Effects Enable Register (02*h*) controls which effects may be overridden. As an example, it is usually desirable for the segmentation block to control the selection of filter application. However, in some regions of documents, especially forms, if the video is known to be of a specific type, it is desirable to prevent the automatic selection of the filter. Additionally, it is usually not desirable for the segmentation block to control image masking, however, in special applications this feature may be desirable.

Referring also to FIG. 4, in conjunction with Table B2, both of which illustrate details of the Tile Length memory, memory 110 includes tile length memory 140*a* and 140*b* in banks A and B, respectively, in addition to corresponding window effects pointer memory 142*a* and 142*b*.

TABLE B2

Tile Lengths Memory Map

| Addr. (hex) | Contents | Data D7 | D6 | D5 | D4 | D3 | D2 | D1 | D0 |
|---|---|---|---|---|---|---|---|---|---|
| 40 | F.S. Length - Tile #1 (LSB) | 1 | 1 | 1 | 1 | 1 | 1 | 1 | 1 |
| 41 | F.S. Length - Tile #1 (MSB) | 1 | 1 | 1 | 1 | 1 | 1 | 1 | 1 |
| 42 | F.S. Length - Tile #2 (LSB) | 0 | 0 | 0 | 1 | 1 | 0 | 0 | 1 |
| 43 | F.S. Length - Tile #2 (MSB) | 0 | 0 | 0 | 0 | 0 | 0 | 0 | 0 |
| 44 | F.S. Length - Tile #3 (LSB) | 0 | 1 | 0 | 1 | 1 | 0 | 0 | 1 |
| 45 | F.S. Length - Tile #3 (MSB) | 0 | 0 | 0 | 0 | 0 | 0 | 0 | 0 |
| 46 | F.S. Length - Tile #4 (LSB) | 1 | 1 | 1 | 1 | 1 | 1 | 1 | 1 |
| 47 | F.S. Length - Tile #4 (MSB) | 1 | 1 | 1 | 1 | 1 | 1 | 1 | 1 |
| 48 | F.S. Length - Tile #5 (LSB) | 0 | 0 | 0 | 1 | 1 | 0 | 0 | 1 |
| 49 | F.S. Length - Tile #5 (MSB) | 0 | 0 | 0 | 0 | 0 | 0 | 0 | 0 |
| 4A | F.S. Length - Tile #6 (LSB) | 0 | 0 | 1 | 1 | 0 | 1 | 0 | 0 |
| 4B | F.S. Length - Tile #6 (MSB) | 0 | 0 | 0 | 0 | 0 | 0 | 0 | 0 |
| 4C | F.S. Length - Tile #7 (LSB) | 0 | 0 | 1 | 0 | 0 | 1 | 1 | 0 |
| 4D | F.S. Length - Tile #7 (MSB) | 0 | 0 | 0 | 0 | 0 | 0 | 0 | 0 |
| 4E | F.S. Length - Tile #8 (LSB) | 0 | 0 | 0 | 1 | 0 | 0 | 1 | 0 |
| 4F | F.S. Length - Tile #8 (MSB) | 0 | 0 | 0 | 0 | 0 | 0 | 0 | 0 |
| 50 | F.S. Length - Tile #9 (LSB) | 1 | 1 | 1 | 1 | 1 | 1 | 1 | 1 |
| 51 | F.S. Length - Tile #9 (MSB) | 1 | 1 | 1 | 1 | 1 | 1 | 1 | 1 |
| 52 | F.S. Length - Tile #10 (LSB) | 0 | 1 | 0 | 0 | 1 | 1 | 0 | 0 |
| 53 | F.S. Length - Tile #10 (MSB) | 0 | 0 | 0 | 0 | 0 | 0 | 0 | 0 |
| 54 | F.S. Length - Tile #11 (LSB) | 0 | 0 | 1 | 1 | 0 | 1 | 1 | 1 |
| 55 | F.S. Length - Tile #11 (MSB) | 0 | 0 | 0 | 0 | 0 | 0 | 0 | 0 |
| 56 | F.S. Length - Tile #12 (LSB) | 1 | 1 | 1 | 1 | 1 | 1 | 1 | 1 |
| 57 | F.S. Length - Tile #12 (MSB) | 1 | 1 | 1 | 1 | 1 | 1 | 1 | 1 |
| 58 | F.S. Length - Tile #13 (LSB) | 1 | 1 | 1 | 1 | 1 | 1 | 1 | 1 |
| 59 | F.S. Length - Tile #13 (MSB) | 1 | 1 | 1 | 1 | 1 | 1 | 1 | 1 |
| 5A | Breakpoint #14 (LSB) | ? | ? | ? | ? | ? | ? | ? | ? |
| 5B | Breakpoint #14 (MSB) | ? | ? | ? | ? | ? | ? | ? | ? |
| | . | | | | | | | | |
| | . | | | | | | | | |
| | . | | | | | | | | |
| 72 | Breakpoint #26 (LSB) | ? | ? | ? | ? | ? | ? | ? | ? |
| 73 | Breakpoint #26 (MSB) | ? | ? | ? | ? | ? | ? | ? | ? |
| 74 | Breakpoint #27 (LSB) | 0 | 0 | 0 | 0 | 0 | 0 | 0 | 0 |
| 75 | Breakpoint #27 (MSB) | 0 | 0 | 0 | 0 | 0 | 0 | 0 | 0 |
| 76 | S.S. Height - Tile #13 (LSB) | 1 | 1 | 1 | 1 | 1 | 1 | 1 | 1 |
| 77 | S.S. Height - Tile #13 (MSB) | 1 | 1 | 1 | 1 | 1 | 1 | 1 | 1 |
| 78 | S.S. Height - Tiles #10, 11, 12 (LSB) | 0 | 0 | 1 | 0 | 0 | 0 | 0 | 0 |
| 79 | S.S. Height - Tiles #10, 11, 12 (MSB) | 0 | 0 | 0 | 0 | 0 | 0 | 0 | 0 |
| 7A | S.S. Height- Tiles #5, 6, 7, 8, 9 (LSB) | 0 | 0 | 0 | 1 | 0 | 0 | 1 | 0 |
| 7B | S.S. Height- Tiles #5, 6, 7, 8, 9 (MSB) | 0 | 0 | 0 | 0 | 0 | 0 | 0 | 0 |
| 7C | S.S. Height- Tiles #2, 3, 4, (LSB) | 0 | 0 | 0 | 0 | 1 | 1 | 0 | 0 |
| 7D | S.S. Height- Tiles #2, 3, 4 (MSB) | 0 | 0 | 0 | 0 | 0 | 0 | 0 | 0 |
| 7E | S.S. Height - Tile #1 (LSB) | 0 | 0 | 0 | 0 | 1 | 1 | 0 | 1 |
| 7F | S.S. Height - Tile #1 (MSB) | 0 | 0 | 0 | 0 | 0 | 0 | 0 | 0 |

While it is conceivable to utilize both banks of memory as one large tile length/pointer table, the present design is intended to enable the use of one bank for control of image processing while enabling the reprogramming of the other bank. By implementing this bank-switching approach for memory 110, the number of possible tiles that are treated within an array of image signals is no longer limited by the size of the memory, because the present system allows for the reprogramming and reuse of both banks, bank A and bank B, during processing of a single image. Table B2 contains an example of the data and organization of one bank of the Tile Length memory, 140*a,b*. An important feature of the Tile Length memory is the flexibility of configuration, thereby permitting the use of up to thirty tiles across a scanline. Moreover, the number of tiles per scanline could be increased by adding additional memory and address decoding logic.

In operation, one of the two banks is used by the window control state machine to direct the operation of the image processing hardware. More particularly, the Tile Lengths, and the associated Window Effects Pointers are used in conjunction to identify the specific window effects (Table B1) to be applied within each tile boundary. Although direct mapping of tile address and effects is possible, it is usually more efficient to implement the indirection of pointers to effects to minimize the required effect memory. However, this application should not be interpreted as solely limited to this strategy, but, to encompass all forms of tile to effect mapping strategies. Each of the 32 possible tile lengths contained in addresses 40*h* through 7F*h* have an associated four-bit pointer value, as illustrated in Table B3.

TABLE B3

Window Effects Pointers Memory Map

| Addr. (hex) | Window Effect Pointer | Access D7 | D6 | D5 | D4 | D3 | D2 | D1 | D0 |
|---|---|---|---|---|---|---|---|---|---|
| 80 | Tile #1 | X | X | X | X | 0 | 0 | 0 | 0 |
| 81 | Tile #2 | X | X | X | X | 0 | 0 | 0 | 0 |
| 82 | Tile #3 | X | X | X | X | 0 | 0 | 0 | 1 |
| 83 | Tile #4 | X | X | X | X | 0 | 0 | 0 | 0 |
| 84 | Tile #5 | X | X | X | X | 0 | 0 | 0 | 0 |
| 85 | Tile #6 | X | X | X | X | 0 | 0 | 0 | 1 |
| 86 | Tile #7 | X | X | X | X | 0 | 0 | 1 | 0 |
| 87 | Tile #8 | X | X | X | X | 0 | 0 | 1 | 1 |
| 88 | Tile #9 | X | X | X | X | 0 | 0 | 0 | 0 |
| 89 | Tile #10 | X | X | X | X | 0 | 0 | 0 | 0 |
| 8A | Tile #11 | X | X | X | X | 0 | 0 | 0 | 1 |
| 8B | Tile #12 | X | X | X | X | 0 | 0 | 0 | 0 |
| 8C | Tile #13 | X | X | X | X | 0 | 0 | 0 | 0 |
| 8D | Tile #14 | X | X | X | X | ? | ? | ? | ? |
| | . | | | | | | | | |
| | . | | | | | | | | |
| | . | | | | | | | | |

TABLE B3-continued

| Window Effects Pointers Memory Map | | | | | | | | | |
|---|---|---|---|---|---|---|---|---|---|
| Addr. | Window | Access | | | | | | | |
| (hex) | Effect Pointer | D7 | D6 | D5 | D4 | D3 | D2 | D1 | D0 |
| 9F | Tile #32 | X | X | X | X | ? | ? | ? | ? |

Whenever a particular tile is identified as the current tile, for example Tile #6, a number, the fast-scan length, of subsequent video signals are processed in accordance with the window effect pointed to by the Window Effect Pointer for Tile #6, shown at address 85*h* in Table B3. Using the pointer 01*h*, the window effect at address location 22*h*-23*h* of Table B1, Window Effect #1, will be used to control the manner in which the video signals lying within Tile #6 will be processed.

Having briefly reviewed the configuration of the memory in window control block 80, the description will now turn to an explanation of the steps involved in the window control process. In one embodiment, these steps are controlled by a digital logic state machine operating in the window control block hardware, although it is also possible to implement the control structure in software which could then be executed on numerous microcontrollers or microprocessors. The following description assumes that the window control hardware and memory are in an operational state, having been reset and preloaded with tile length data, tile pointers, and window effects, as illustrated by Tables B1-B3. Preloading of the tile length and pointer data is accomplished via an external device, for instance μP 24, which writes data to a nonoperative memory bank via address multiplexer 144*b* of FIG. 4. Moreover, bank A may be programmed by μP 24 while bank B is being accessed for processing of video signals. The control of this bank switching capability is enabled by the combination of address multiplexers 144*a* and 144*b*.

Figure 7A:
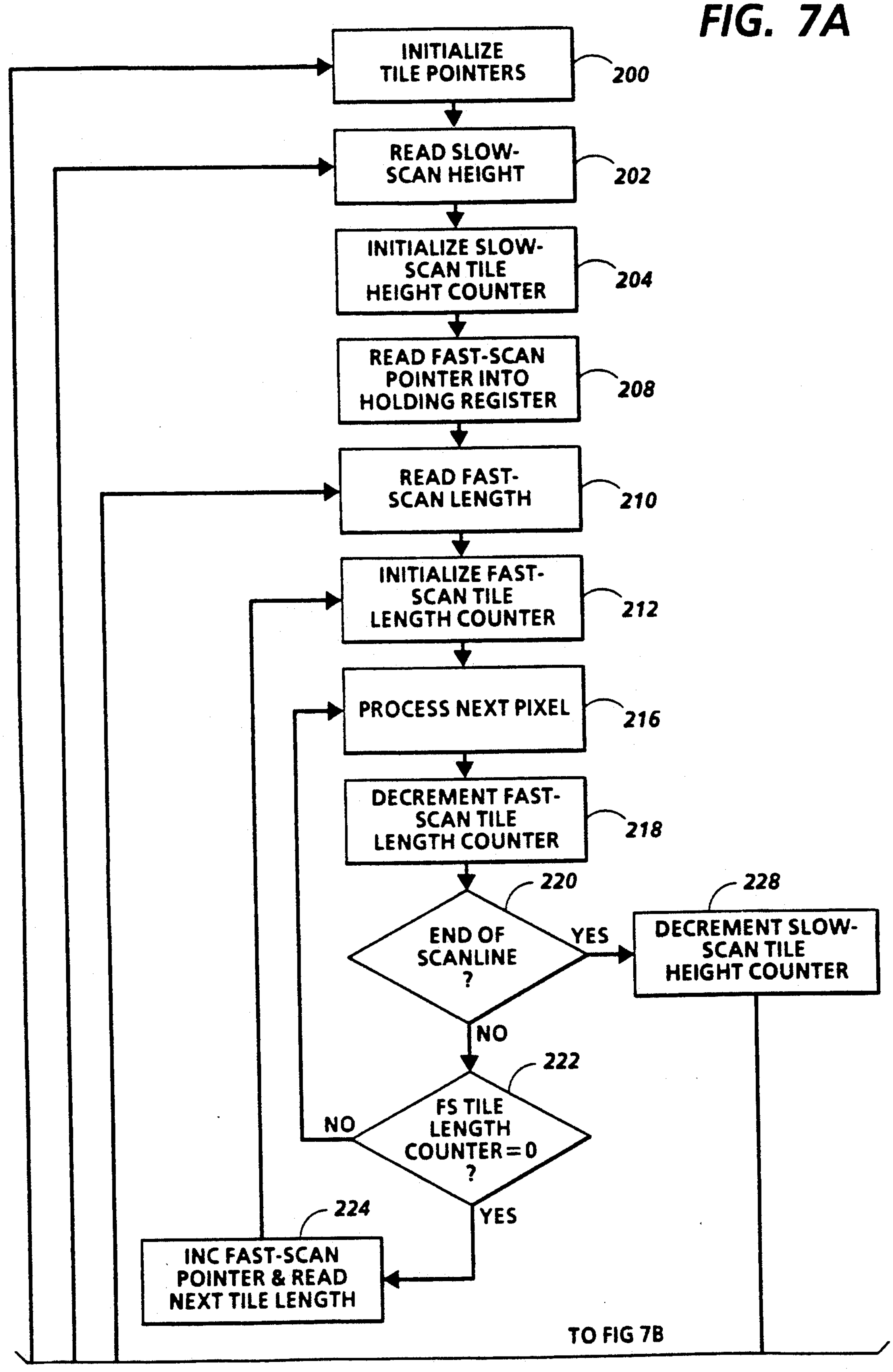
FIGS. 7A and 7B represent a flow chart illustrating the control steps executed by the present invention during processing a stream of digital input signals.
Figure 7B:
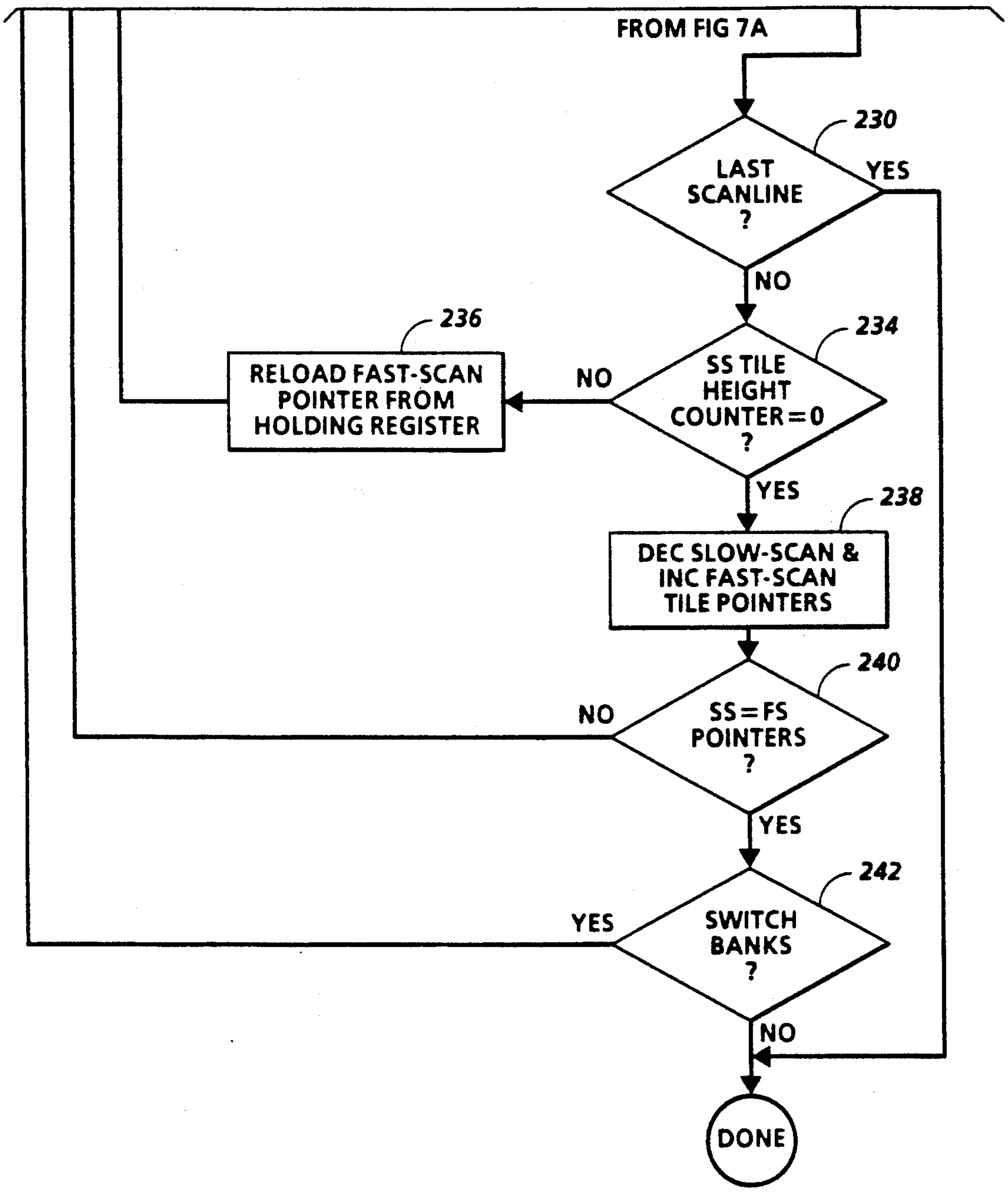

Turning now to FIGS. 7A and 7B, which illustrate the general steps performed by the window control hardware, the process typically begins with initialization step 200, where the tile length and height pointers are initialized. The initialization includes a reset of address counter 116 to initialize the fast-scan pointer to address 40*h*, and slow-scan pointer to address 7E*h*, the two extremes of the Tile Lengths memory (Table B2). In one embodiment, the fast-scan pointer value is maintained by an up-counter, while the slow-scan pointer is maintained by a down-counter. Once initialized, the slow-scan height is read at step 202, and loaded into SS Tile Height counter 124 of FIG. 4, step 204. The SS Tile Height counter, also a down-counter, will be decremented at the end of each complete scanline or raster of video signals. Next, the fast-scan pointer value is read and stored into a holding register (not shown) at step 208. The fast-scan pointer value is maintained in the holding register to allow the system to reuse that fast-scan pointer value at the beginning of each new scanline. Subsequently, the fast-scan length is read from the location pointed to by the fast-scan pointer, step 210, and FS Tile Length counter 122 is initialized with the value stored in the memory location pointed to by the fast-scan length pointer, step 212.

Following counter initialization, steps 200-212, the next pixel, or video signal is processed by the image processing hardware. As previously described, the window effect pointer for the tile in which the pixel is present determines the image processing treatment that the pixel will receive. Once the pixel is processed at step 216, the FS Tile Length counter is decremented at step 218. Next, the hardware determines if the end of the scanline has been reached, as determined from an End-Of-Line (EOL) or similar signal passed to 2 D hardware block 34 on control lines 98. If no EOL signal is detected by step 220, the FS Tile Length counter is checked, step 222, to determine if it has reached zero. If not, processing continues at step 216 where the next pixel within the tile will be processed. If the FS Tile Length counter is at zero, indicating that a tile boundary has been reached, the fast-scan pointer is incremented and the next FS Tile Length is read from the appropriate Tile Lengths memory bank, step 224.

When the end of a scanline has been reached, as determined in step 220, processing continues at step 228, where the SS Tile Height counter is decremented. Next, a test is executed to determine if the previous scanline was the last scanline, step 230, the determination being made once again by analysis of an End-Of-Scan (EOS) or similar signal which undergoes a detectable logic transition when all of the video signals within an input image have been processed. Like the EOL signal, the EOS signal is typically generated by an external source and transmitted to the 2 D hardware block via control lines 98. If an EOS signal has been detected, processing is complete and the window control process is done. Otherwise, the end of the image has not been reached, and processing continues at step 234. Step 234 determines if the SS Tile Height counter has reached zero. If not, the fast-scan tile pointer value previously stored in the holding register is reloaded as the current fast-scan pointer, step 236, and processing continues at step 210, beginning with the first video signal of the new raster. If the SS Tile Height counter has reached zero, the slow-scan pointer is decremented and the fast-scan pointer is incremented, step 238, thereby causing both pointers to point to the next pointer value. Subsequently, the pointers are compared at step 240 to determine if they point to the same location, thereby indicating that the tile length list in the current bank of memory has been exhausted. If the pointer values are equal, the banks may be switched, step 240, to select the previously idle bank as the currently active bank. Subsequent processing would then continue at step 200, as previously described. Alternatively, if the idle bank was not programmed, the system could exit the process. When the pointer values are not determined to be equal by step 240, processing continues at step 202 using the newly established pointer values as indexes into the Tile Lengths memory.

The allocation of memory within banks A and B has been designed to allow maximum flexibility to the electronic reprographics system in programming the control of tile processing. Any combination of fast-scan and slow-scan tile boundaries can be implemented, up to a total of 31 length/height values, with the present memory configuration. The requirement of the previously described embodiment for an intervening, zero-filled tile length, for instance locations 74*h*-75*h* in Table B2, is manifest from the test executed at step 240. However, an additional tile length/height value may be included if the test is modified to determine when the pointer values have crossed one another (e.g., when the fast-scan pointer is greater than the slow-scan pointer). Furthermore, the size of the memory banks may be increased to allow additional tile length/height data, however, this would also result in the need for larger pointer values and increased address decoding hardware.

Having described the functionality of the present invention, attention is turned now to an illustrative example of how the window control memory would be programmed to operate on an image array. The example is embodied in FIGS. 2A and 2B, and in Table B1-B3. Referring once again to FIG. 2A, where a pair of overlapping windows are shown in an array of image signals, array 50 was divided into four distinct regions by the overlapping windows. Furthermore, FIG. 2B illustrates how a series of non-overlapping tiles, oriented along the fast-scan direction, may be used to represent all or part of the four distinct regions. As indicated by the shading in FIG. 2A, four distinct image processing operations are to be applied to the four regions defined by windows 52 and 54. Table C illustrates an example of the four image processing effects that might be applied to the four regions of FIG. 2A.

TABLE C

| | Example | |
|---|---|---|
| Window Effect Pointer | Region | Effect |
| 0 h | A | Segmentation |
| 1 h | B | Filter 1, Threshold 1, Invert Video |
| 2 h | C | Moire Away, Threshold 1 |
| 3 h | D | Threshold 2, TRC (enabled) |

Having defined the image processing effects, the window effects memory must be programmed as illustrated in Table B1. For example, Window Effect #1, address 22*h*-23*h*, has bits D7 of the LSB and D1 of the MSB set to a binary value of one to indicate inversion and filter selection, respectively. Moreover, the zeros in bit positions D5 and D6 of the LSB indicate a thresholded output using Threshold 1. In a similar fashion, the three remaining window effects are programmed in the window effects memory map. While additional window effects may be programmed at the residual memory locations in the Window Effects memory (Table B1), addresses 28*h* through 3F*h*, they are left as unknowns in the present example, as no regions utilize those effects.

Having divided each of the regions of FIG. 2A into tiles, FIG. 2B, and having identified the window effects to be applied in each region, Table C, the only task remaining in preparation of the window control hardware is programming of tile length/pointer memory 110 of FIG. 4. First, the fast-scan length and slow-scan height of each tile must be determined. The lengths and heights of the tiles may be determined by the following equations:

$$FS\ \text{Length} = (FS_{finish} - FS_{start});$$

and $$SS\ \text{Height} = (SS_{finish} - SS_{start}).$$

For instance, Tile 7, has its upper-left corner at location (75,33), and its lower-right corner at (112,50). Hence, the fast-scan length (FS Length) of Tile 7 is thirty-eight and the slow-scan height (SS Height) is eighteen, these values being reflected as binary values in locations 4C-4D*h* and 7A-7B*h*, respectively, in Table B2. Generally, these values are placed in the appropriate memory locations in tile length memory 140*a* or 140*b*, depending upon the active memory bank selection. Second, the window effect identified for Tile 7, pointer value 02*h*, is written to memory location 86*h* in the corresponding pointer memory, 142*a* or 142*b*. Likewise, the values for Tiles 1 through 13 are calculated and placed in memory 110, to complete the programming operation. The binary values shown in Table B1-B3 are representative of the values which would enable processing of the image signals in accordance with the previous description, and, therefore are representative of a decomposition of overlapping windows into a set of non-overlapping tiles.

In recapitulation, the present invention implements an efficient tile management and control scheme to enable the selection of various image processing effects in complex overlapping windows that are defined within an array of image data. It is, therefore, apparent that there has been provided in accordance with the present invention, a method and apparatus for controlling the processing of digital image signals that fully satisfies the aims and advantages hereinbefore set forth. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An apparatus for processing video input signals of an image to produce modified video signals, comprising:

means for identifying each video signal in a non-overlapping tile region within the image, including
  memory having a plurality of contiguous dimension storage locations suitable for storage of a dimensional value therein, and a plurality of associated pointer storage locations, each pointer storage location being suitable for the storage of a pointer value uniquely associated with one of said dimension storage locations,
  first indexing means for identifying, within said memory, the dimension storage location containing a length of the tile region,
  second indexing means for identifying, within said memory, the dimension storage location containing a height of the tile region, and
  control means for regulating the advancement of said first and second indexing means as a function of the position of the video signal within the image;

means for designating at least one image processing operation to be applied to each video input signal within the boundaries of the non-overlapping tile region; and image processing means, responsive to the designating means, for processing each video input signal in accordance with the designated image processing operation to produce the modified video signals.

2. The apparatus of claim 1, wherein said memory means includes at least two banks of memory, a first memory bank adapted for use with said first and second indexing means to identify a tile region for each video signal, and a second memory bank adapted to be programmed with dimensional and image processing designation information without impacting the operation of the image processing apparatus.

3. The apparatus of claim 2, wherein said control means further comprises:

a first counter, responsive to the processing of one of the video signals, for initially receiving a value representative of the length of the tile from said memory and subsequently decrementing by one each time the video signal is processed, said first counter further emitting a signal upon reaching a zero value;

means, responsive to the processing of said video signals, for signaling when a complete video raster has been processed;

a second counter, responsive to the signaling means, for initially receiving a value representative of the height of the tile from said memory, said second counter subsequently decrementing by one each time a complete video raster is processed by the apparatus, said counter also emitting a signal upon reaching a zero value; and a state machine, responsive to said first and second counter signals, for automatically increasing the first indexing means upon detection of the first counter signal and automatically decreasing the second indexing means upon detection of the second counter signal, said state machine further recognizing when said first and second indexing means have reached a common dimension storage location, thereby detecting that the dimensional values stored in the first memory bank have been exhausted.

4. The image processing apparatus of claim 3, wherein said state machine includes means for swapping the second bank of memory for the first bank of memory upon detecting that the dimensional values in the first bank have been exhausted.

5. The image processing apparatus of claim 3, wherein said first and second counters are down-counters.

6. The image processing apparatus of claim 1, wherein said designation means comprises:

a plurality of image processing effect registers, each effect register including at least one binary storage location used to specify a particular image processing operation to be applied to the video signal;

means, operative in conjunction with the first indexing means, for reading the pointer value associated with the dimension storage value specified by the first indexing means; and means, responsive to said pointer value, for selecting an image processing effect register and thereby denoting the image processing operation to be applied to the video signal.

7. The apparatus of claim 1, wherein:

said first indexing means increases as a function of the position of the video signal along a fast scan direction; and said second indexing means decreases as a function of the position video signal along a slow scan direction.

8. The apparatus of claim 1, wherein at least one non-overlapping tile region has a height equal to a single video signal element.

9. The apparatus of claim 1, wherein at least one non-overlapping tile region has a length equal to a single video signal element.

10. The apparatus of claim 1, wherein a plurality of tile lengths are stored in contiguous dimension storage locations separate from the dimension storage location containing the tile height.

11. An apparatus for sequentially processing an orthogonal array of digital image signals to produce an array of modified digital image signals, comprising:

means for characterizing a plurality of window regions superimposed on the array of digital image signals as a set of non-overlapping tile regions;

means for distinguishing, within the array of digital image signals, a plurality of discrete tile regions, wherein at least one tile region represents each window region, said distinguishing means including, storage means having a plurality of dimension storage locations suitable for the interchangeable storage of the longitudinal dimensions and the latitudinal dimensions of the tile regions, first indexing means for identifying, within the storage means, the dimension storage location containing the longitudinal dimension of the tile region within which a selected image signal is located, second indexing means for identifying, within the storage means, the dimension storage location containing the latitudinal dimension of the tile region within which the selected image signal is located, and control means for regulating the advancement of said first and second indexing means as a function of the location of the selected digital image signal;

means, operative during the processing of the array of digital image signals, for indicating an image processing effect to be applied to a selected digital image signal, said image processing effect being determined as a function of the tile region within which the selected digital image signal is located; and means, responsive to said indicating means, for successively processing each image signal in accordance with the image processing effect defined for the tile region, thereby producing the modified digital image signals.

12. The apparatus of claim 10, wherein said tile regions are rectangular in shape.

13. The image processing apparatus of claim 11, wherein said storage means includes at least two banks of memory, a first bank being adapted for use with said first and second indexing means to identify a tile region for the selected signal, and a second bank adapted to be programmed with dimensional and image processing designation information without impacting the operation of the image processing apparatus.

14. The image processing apparatus of claim 13, wherein said control means further comprises:

a first counter, responsive to the processing of the selected signal, for initially receiving a value representative of the length of the tile from the memory and subsequently decrementing by one each time the selected signal is processed, said first counter further emitting a signal upon reaching a zero value;

means, responsive to the processing of the selected signals, for signaling when a complete video raster has been processed;

a second counter, responsive to the signaling means, for initially receiving a value representative of the height of the tile from the memory, said second counter subsequently decrementing by one each time a video raster is processed by the apparatus, said counter also emitting a signal upon reaching a zero value; and a state machine, responsive to said first and second counter signals, for automatically advancing the first indexing means upon detection of the first counter signal and automatically advancing the second indexing means upon detection of the second counter signal, said state machine further recognizing when the dimensional values stored in the first memory bank have been exhausted.

15. The image processing apparatus of claim 14, wherein said state machine includes means for swapping the second bank of memory for the first bank of memory upon detecting that the dimensional values in the first bank have been exhausted.

16. The image processing apparatus of claim 14, wherein said first and second counters are down-counters.

17. The image processing apparatus of claim 11, wherein said indicating means comprises:

a plurality of image processing effect registers, each effect register consisting of at least one binary storage location used to specify a particular image processing operation to be applied to the selected signal;

means, operative in conjunction with the first indexing means, for reading a pointer value associated with the dimension storage value specified by the first indexing means; and means, responsive to said pointer value, for selecting an image processing effect register and thereby denoting the image processing operation to be applied to the selected signal.

18. The apparatus of claim 11, wherein said storage means further includes a plurality of window effect pointer storage locations, each being suitable for the storage of a pointer value uniquely associated with one of said dimension storage locations.

19. A method for selectively controlling the application of at least one image processing effect to a plurality of digital signals representing an image, comprising the steps of:

(a) partitioning the image into a plurality of windows;

(b) characterizing the windows as a plurality of sequential, non-overlapping tiles;

(c) determining the lengths of all non-overlapping tiles, and storing said lengths in successive locations in a memory;

(d) determining a common height for each set of laterally adjacent tiles, and storing said common heights in successive locations in the memory;

(e) initializing data elements based upon the characteristics stored in steps (c) and (d), including the steps of:

(e)(i) initializing a tile length pointer to point to the location in the memory where the first tile length is stored;

(e)(ii) initializing a tile height pointer to point to a location in the memory where the first tile height is stored;

(e)(iii) reading the tile height pointed to by the tile height pointer and loading a tile height counter with said height value; and (e)(iv) reading the tile length pointed to by the tile length pointer and loading a tile length counter with said length value;

(f) consecutively selecting an unprocessed signal from the plurality of digital image signals;

(g) identifying the non-overlapping tile region within which the selected signal lies;

(h) determining the image processing operation to be applied to the selected signal based upon the identification of the non-overlapping tile region in step (g);

(i) processing the selected signal in accordance with the image processing operation determined in step (h);

(j) updating the data elements, including the steps of:

(j)(i) determining if the end of a raster has been reached, and if so, continuing at step (j)(vii); otherwise (j)(ii) decrementing the tile length counter; and (j)(iii) if said tile length counter contains a non-zero value then continuing the process at the step of consecutively selecting an unprocessed signal from the plurality of digital image signals; otherwise (j)(iv) moving the tile length pointer to the next successive memory location;

(j)(v) reading the tile length pointed to by the tile length pointer;

(j)(vi) loading a tile length counter with said length value;

(j)(vii) determining if all digital signals have been processed, and if so, disabling further processing of the signals; otherwise (j)(viii) decrementing the tile height counter, and if the value of said tile height counter is equal to zero, continuing at step (j)(x); otherwise (j)(ix) resetting the tile length pointer to point to the first tile length for the set of laterally adjacent tiles containing the most recently completed raster of digital signals;

(j)(x) moving the tile length pointer to point to the next available memory location where a tile length is stored;

(j)(xi) moving the tile height pointer to point to the next available memory location where a common tile height is stored;

(k) checking to determine if the tile characteristics stored in memory have been exhausted; and if so (l) suspending further processing; otherwise (m) continuing at step (f).

20. The method of claim 19, wherein the step of initializing a tile length pointer to point to the location in memory where the first tile length is stored further includes the step of storing the tile length pointer in a holding register, and the step of moving the tile length pointer to point to the next available memory location where a tile length is stored includes the step of reestablishing the length pointer from the value previously stored in the holding register.

21. The method of claim 19, wherein the step of partitioning the image into a plurality of non-overlapping tiles further includes the steps of identifying an image processing effect to be applied to all signals lying within the non-overlapping tiles, and storing an indication of the image processing effect for each tile in successive memory locations associated with said stored tile lengths, and where the step of determining the image processing operation to be applied to the selected signal further includes the steps of:

determining, from said tile length pointer, an associated window effects pointer for the tile in which the selected signal lies;

reading the window effect value pointed to by said window effects pointer; and selecting at least one image processing effect indicated by said window effect value to be applied to the selected signal.

* * * * *